United States Patent [19]

Monroe et al.

[11] Patent Number: 4,915,716
[45] Date of Patent: Apr. 10, 1990

[54] FABRICATION OF LIGHTGUIDE SOOT PREFORMS

[75] Inventors: Douglas W. Monroe, Newtown Township, Bucks County, Pa.; Chenkou Wei, East Windsor Township, Mercer County, N.J.

[73] Assignee: American Telephone and Telegraph Company, New York, N.Y.

[21] Appl. No.: 202,749

[22] Filed: Jun. 3, 1988

Related U.S. Application Data

[63] Continuation of Ser. No. 914,417, Oct. 2, 1986, abandoned.

[51] Int. Cl.⁴ .......................................... C03B 37/018
[52] U.S. Cl. ..................................... 65/2; 65/3.12; 65/18.2; 427/163; 427/166
[58] Field of Search ................ 65/3.12, 18.2, 2, 157, 65/144; 427/163, 166, 167, 255.2, 255.3

[56] References Cited

U.S. PATENT DOCUMENTS

| | | | |
|---|---|---|---|
| 3,966,446 | 6/1976 | Miller | 65/2 |
| 4,165,223 | 8/1979 | Powers | 65/2 |
| 4,192,656 | 3/1980 | Worrell | 48/192 |
| 4,263,032 | 4/1981 | Sinclair | 65/3.12 |
| 4,298,365 | 11/1981 | Bailey et al. | 65/3.12 |
| 4,314,837 | 2/1982 | Blankenship | 65/3.12 |
| 4,344,670 | 8/1982 | Blankenship | 350/96.31 |
| 4,345,928 | 8/1982 | Kawachi et al. | 65/18.2 |
| 4,367,085 | 1/1983 | Suto et al. | 65/18.2 |
| 4,453,961 | 6/1984 | Berkey | 65/18.2 |
| 4,465,708 | 8/1984 | Fanucci et al. | 427/163 |
| 4,618,354 | 10/1986 | Suda | 65/18.2 |

OTHER PUBLICATIONS

"High-Rate Fabrication of Wholly Synthesized Fiber Preforms by the Multi-Flame VAD Method With SiHCl₃ Raw Materials", by Suda et al. in the IOOC--ECOC '85 Proceedings.

"Double-Flame VAD Process for High-Rate Optical Preform Fabrication", by H. Suda et al., Electronics Letters, 1/3/85, vol. 21, No. 1, pp. 29-30.

Primary Examiner—Kenneth M. Schor
Attorney, Agent, or Firm—Roderick B. Anderson

[57] ABSTRACT

A glass soot deposition torch (30; FIG. 2) having gas passages arranged to provide an inner (34) and outer (36) flame front is disclosed in which the temperature of the inner front is higher than the outer front. A passage is located within the outer front (36) through which glass soot (32) is directed onto the surface of a growing soot-form core (38).

6 Claims, 2 Drawing Sheets

FABRICATION OF LIGHTGUIDE SOOT PREFORMS

This is a continuation of application Ser. No. 914,417 filed Oct. 2, 1986, now abandoned.

TECHNICAL FIELD

The instant invention is related to the fabrication of lightguide preforms. In particular, the invention is directed to a technique for depositing glass soot to fabricate a single mode lightguide soot-form.

BACKGROUND OF THE INVENTION

The Vapor-phase Axial Deposition (VAD) method of fabricating multimode optical fiber is described in U.S. Patent 3,966,446 which issued on June 29, 1976 and is assigned to Bell Telephone Laboratories. The VAD process begins with the deposition of germanium phosphosilicate soot particles, which are formed by the hydrolysis of $SiCl_4$, $GeCl_4$, and $POCl_3$ in an oxyhydrogen flame, on the end of a rotating bait rod. The bait rod is slowly moved away from the torch resulting in a substantially cylindrical, porous soot-form. The porous soot-form is subsequently dehydrated and consolidated at an elevated temperature into a clear glass boule. The consolidated glass boule is then stretched into an elongated rod that is to be used as the core of a preform from which multimode lightguide fiber is drawn. The cladding of the preform is formed by the so-called "rod-in-tube" method, which entails the collapse of a silica tube over the core rod which is inserted therein.

In the VAD method for producing single-mode lightguide fiber preforms, it is necessary to produce a small core upon which several cladding layers are deposited. To achieve an optimum clad-to-core ratio of 15:1 in one deposition step while maintaining manageable soot-form size, the core diameter should not be any larger than 18 mm (soot). Under growth conditions, the porous core material should be of sufficient density to support the heavy cladding layers deposited upon it. Also, the core soot should be uniform radial density in order to avoid bubble formation at the clad-to-clad interface upon consolidation.

In fabricating single-mode optical fibers by the VAD method, as described in U.S. Pat. No. 4,345,928 to Kawachi et al, which is incorporated by reference herein, the cladding material cannot be fabricated solely by the rod-intube method described above. Because of the small diameter of the single mode fiber core (e.g., 5 to 10 $\mu m$), part of the lightwave traveling therealong finds passage in a portion of the clad near the core. The rod-in-tube method of fabricating all the cladding material results in a fiber that has high attenuation due to the presence of OH in the cladding. Thus, for low-loss, single-mode fibers made by the VAD Method, part of the cladding material must be fabricated, like the core, with a soot deposition step to be followed by dehydration before consolidation into a clear glass lightguide preform.

Typically, the amount of cladding material to be fabricated in this manner must yield a soot-form that has a deposited clad-to-core diameter ratio higher than 6 to 1. Thus, for single-mode fiber fabrication, the VAD method entails the use of several oxy-hydrogen torches for simultaneous soot formation; one torch for the axial deposition of a core and one or more torches to radially deposit the clad. After dehydration and consolidation, the resulting clear glass boule is also stretched and extra cladding material is added by the above-described rod-in-tube method to attain the proper clad-to-core diameter ratio to give the desired cutoff wavelength. Typically, for a 125 $\mu m$ outside diameter fiber with a cutoff wavelength of 1.15 $\mu m$ and a step index of $\Delta n=0.004$, the core has a diameter of approximately 8 $\mu m$.

In multimode VAD fabrication, a circular cross-section torch comprised of five concentric, spaced quartz tubes is used to make the soot-forms for fabricating the core of the preform. Two inner tubes deliver the chemicals, $SiCl_4$, $GeCl_4$, and $POCl_3$, while the other three tubes supply $H_2$, Ar and $O_2$ for the oxyhydrogen flame. Typically, a soot-form that is made with this torch configuration has a core diameter on order of 50 mm. If a similar torch configuration is employed for single-mode fiber fabrication, the overall soot-form which encompasses both the core and clad would be overwhelmingly large (e.g., 300 mm). Such large soot-forms have built-in stresses making handling and sintering extremely difficult. Thus, for single-mode fiber fabrication, a technique must be developed to fabricate the core of the single-mode soot-form having a diameter any larger than 18 mm.

U.S. Pat. No. 4,465,708 to Fanucci et al, which is also incorporated by reference herein, is directed to a torch used in the VAD process to form small cores for single mode lightguide preforms. The torch is comprised of a plurality of concentrically mounted, spaced glass tubes through which reactants and combustible materials are passed. A tapered shroud is mounted about the end of the torch and shield gas is directed along the inner surface thereof to confine and direct the gases and reactants to the surface of the growing soot-form.

Although this technique is effective in producing small diameter cores (e.g., 16.5 mm), the refractive index and density profiles can be adversely affected due to the fact that the shroud may produce a non-uniform temperature distribution on the core surface. This process results in a core that has a hot (approximately 900° C.) tip and progressively cooler regions as one moves upward along the surface. Such a thermal pattern can cause a dense, germanium-depleted area to form at the center of the core. As one progresses radially toward the edge, the germanium increases significantly and the density decreases significantly to the point at which the outer surface of the core is a very loosely bound, fluffy layer of germania rich soot particles. This fluffy layer can cause problems, not only during boule growth, but during consolidation as well. During growth, this loosely bound layer of soot may not be capable of supporting the weight from cladding deposition before cracking. Furthermore, during consolidation, the loose layer of germania rich soot can cause bubbles to form at the clad-to-core interface, thus rendering some of the resulting preforms useless for fiber production.

SUMMARY OF THE INVENTION

The foregoing problems have been overcome by directing gases through a torch to form a first flame front having a first temperature; directing additional gases through the torch to form a second flame front within the first flame front at a temperature higher than said first temperature; forming a stream of glassy soot by directing reactants through the torch and said second flame front; and axially depositing said glassy soot on a growing lightguide soot-form.

DETAILED DESCRIPTION

Figure 1:
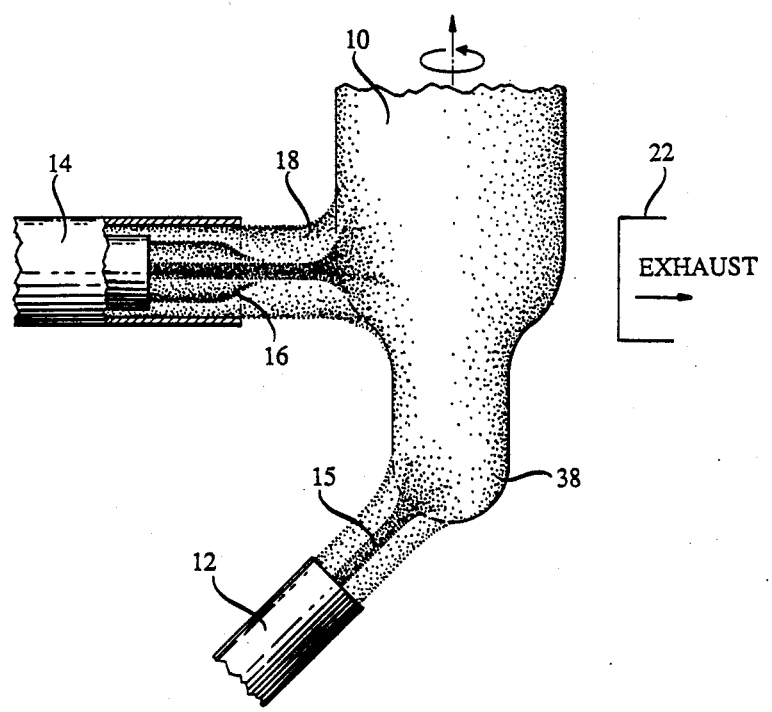
FIG. 1 is a schematic drawing of a high rate VAD fabrication system.

FIG. 1 is a schematic diagram of a system to fabricate a multimode soot preform which is described in an article entitled "High-Rate Fabrication of Wholly Synthesized Fiber Preforms by the Multi-Flame VAD Method With $SiHCl_3$ Raw Materials" by Suda et al. in the IOOC-ECOC '85 proceedings. The diagram depicts a soot-form 10 being fabricated by using a conventional single-flame burner 12 for core synthesis and a double flame burner 14 for cladding synthesis.

The single flame burner 12 is typically comprised of a plurality of concentric, spaced tubes in which precursors 15 are directed from the inner tubes while oxygen and hydrogen are provided from the outer tubes to form the flame which heats the precursors to form the glass soot. The double flame burner 14 also feed precursors 15 centrally but has oxygen and hydrogen directed in such a manner as to form inner and outer oxy-hydrogen flame fronts, 16 ad 18, respectively. As is known in the art, "flame front" means the boundary between two dissimilar gases whose reaction causes a flame, in this case oxygen and hydrogen. The inner front would have to be at a lower temperature than the outer front in order to promote a high deposition rate. Undeposited material is removed via an exhaust 22. Such a technique is effective for fabricating multimode soot performs but cannot be used for the smaller core diameter single mode preforms for the reasons hereinbefore set forth.

Figure 2:
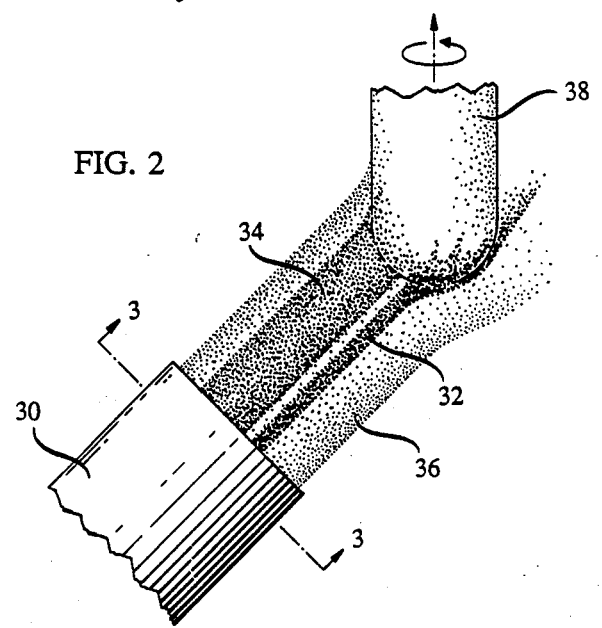
FIG. 2 is a schematic drawing of an off-centered VAD torch embodying the instant invention.

The torch 30 shown in FIG. 2 overcomes the foregoing problems. The torch 30 provides an off-centered soot particle stream 32 with appropriate gas configuration and flow rates to generate two oxy-hydrogen flame fronts: one inner front 34 and one outer front 36. The nature and configuration of soot stream 32 and flame fronts 34 and 46 can best be understood by reference to FIG. 3, which is a view taken along plane 3—3 of FIG. 2. Gases are projected through tubes 41, 42, 44, 45, and 46 and a glass-forming reactant containing silicon is projected form tube 43. Oxygen is projected from tube 41 and from an annular opening defined by tube 46. Hydrogen is projected form an opening defined by tube 44, while argon is projected from tubes 42 and 45. The boundary at which the hydrogen and oxygen meet and react is called the "flame front." (See, for example, U.S. Pat. No. 4,192,656 at Column 3, lines 27-28 and the book *Flames*, A. G. Gordon and W. B. Wolfhord, Chapman and Hall, 1979, page 152, FIG. 6.4). Since the hydrogen and oxygen meet at two boundaries, there are two flame fronts, an outer flame front and an inner flame front within the outer flame front. The glass-forming reactant projected from tube 43 becomes soot stream 32, which is encircled by the outer flame front but not by the inner flame front. It is difficult to portray the flame fronts in FIG. 2 since they are not structural; but from a comparison with FIG. 3, it can be appreciated that soot particle stream 32 resulting from the glass forming reactants is beneath the inner front 34 and is surrounded by the outer front 36. The inner flame front 34 can be adjusted to uniformly heat the lower portion of the soot-form core 38 to 500° C. to 1,000° C. to maintain uniform soot density and germanium concentration. The outer front 36 is on the order of approximately 200° C. less than the inner front. Below the inner flame front 34, soot particles 32 are formed in a reaction with the oxygen from both the inner front 34 and the outer front 36. After the soot particles 32 are deposited on the bottom surface of the core 38, the cooler, excess, non-deposited particles are repelled from the hot core surface by thermophoretic force. By restricting the deposition area in this manner, small diameter cores 38 have been attained with uniform density.

Figure 3:
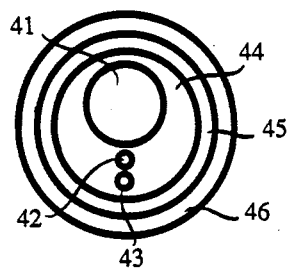
FIG. 3 is a cross-sectional view of the torch shown in FIG. 2 taken in the plane 3—3.

A cross section of an exemplary embodiment of the torch 30 is shown in FIG. 3. The torch 30 is comprised of a plurality of cylindrical quartz tubes arranged to provide two flame fronts with an off-centered soot stream. The gases and reactants associated with the specific quartz tubes are shown in the following table:

TABLE I

| Tube No. | I.D. (mm) | O.D. (mm) | Flow Rate-Gas/Reactant |
| --- | --- | --- | --- |
| 41 | 3.8 | 4.6 | 5 l/min. $O_2$ |
| 42 | 2.0 | 3.2 | .4 l/min. Ar |
| 43 | 1.0 | 2.2 | 125 cc/min. raw material ($SiCl_4 + GeCl_4$) |
| 44 | 11.8 | 13.0 | 2 l/min. $H_2$ |
| 45 | 15.1 | 16.3 | 1.5 l/min. Ar |
| 46 | 18.4 | 20.4 | 1.0 l/min. $O_2$ |

This torch 30 was used to fabricate soot-forms having a soot core diameter from 8.0 mm to 13.4 mm with a density of approximately $0.4 g/cm^3$. Such density is sufficient to support the cladding needed to produce a preform with a clad-to-core ratio of 15:1.

Figure 4:
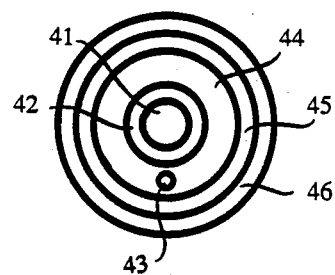
FIGS. 4 and 5 are cross-sectional views of the torch shown in FIG. 2 which depict additional embodiments of the instant invention.

FIG. 4 is a cross-sectional view of another exemplary torch 30. The gases and reactants associated with the specific quartz tubes are shown in the following Table:

TABLE II

| Tube No. | I.D. (mm) | O.D. (mm) | Velocity-Gas/Reactant |
| --- | --- | --- | --- |
| 41 | 2.5 | 3.7 | .75 1/min. $O_2$ |
| 42 | 5.7 | 6.9 | 1.0 1/min. Ar |
| 43 | 1.0 | 2.0 | 125 cc/min. raw material ($SiCl_4 + GeCl_4$) |
| 44 | 10.9 | 12.1 | 2.0 1/min. $H_2$ |
| 45 | 14.1 | 15.1 | 1.5 1/min. Ar |
| 46 | 18.3 | 20.3 | 5.0 1/min. $O_2$ |

Figure 5:
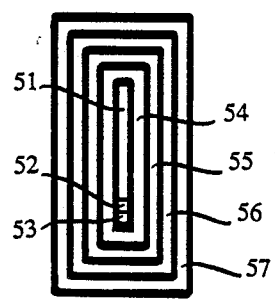

FIG. 5 is an exemplary embodiment of a rectangular, off-centered, two-flame front torch 30. The gases and reactants associated with the specific tubes are shown in Table III:

TABLE III

| Tube No. | I.D. Length (mm) | I.D. Width (mm) | Wall Thickness (mm) | Gas/Reactant |
| --- | --- | --- | --- | --- |
| 51 | 9 | 1 | 0.5 | $O_2$ |
| 52 | 1 | 1 | 0.5 | Ar |
| 53 | 1 | 1 | 0.5 | raw material |
| 54 | 16 | 4 | 0.5 | Ar |
| 55 | 19 | 7.6 | 0.5 | $H_2$ |
| 56 | 22 | 10.6 | 0.5 | Ar |
| 57 | 25.4 | 14.2 | 0.8 | $O_2$ |

It is to be understood that the embodiments described herein are merely illustrative of the invention. Various modifications may be made thereto by persons skilled in the art which may embody the principles of the invention and fall within the spirit and scope thereof.

What is claimed is:

1. A method of forming a lightguide preform by vapor-phase axial deposition comprising the steps of:

feeding glass-forming reactants as a gas through a double-flame torch;

directing gases through the torch toward a support structure to form an outer flame front between an outermost gas and an intermediate gas, said outer flame front having a first temperature;

directing an additional gas through the torch toward the support structure to form an inner flame front between an intermediate gas and said additional gas, said inner flame front having a second temperature and being substantially surrounded by said outer flame front;

forming a stream of glassy soot by directing said reactants through the torch and substantially surrounded by the outer flame front toward the support structure, said reactants being of appropriate composition and having appropriate properties to react at the temperatures at which they are subjected so as to form a glassy soot stream of glassy soot particles, part of which is deposited on the support structure to form a sootform;

consolidating the soot-form to form a lightguide preform, wherein:

said second temperature of the inner flame front is sufficiently higher than said first temperature of the outer flame front so as to establish a significant temperature gradient at the location on the support structure at which glassy soot is deposited, which gradient decreases in temperature in a direction from the center of the double flame toward the outside of the double flame, and is sufficiently pronounced that excess non-deposited glassy soot particles of the glassy soot stream are directed away from the support structure by thermophoretic forces.

2. The method of claim 1 wherein;

the reactants are directed along a line that is off-center with respect to both the inner and outer flame fronts.

3. The method of claim 2 wherein;

said temperature of the inner flame front is on the order of 200° C. higher than said temperature of the outer flame front.

4. The method of claim 2 wherein;

the temperature of the inner flame front is at least 100° C. higher than the temperature of the outer flame front.

5. The method of claim 1 wherein;

the glass forming reactants are directed along a path that is substantially surrounded by the outer flame front but not surrounded by the inner flame front.

6. The method of claim 5 wherein;

the first intermediate gases are hydrogen and the outermost gas and the additional gas are both an oxygen-containing gas.

* * * * *